United States Patent
Kitamura

(10) Patent No.: US 11,860,648 B2
(45) Date of Patent: Jan. 2, 2024

(54) DEVICE MANAGEMENT SYSTEM WITH IMPROVED ABILITY TO IDENTIFY CAUSE OF ANOMALY IN DEVICE

(71) Applicant: DAIKIN INDUSTRIES, LTD., Osaka (JP)

(72) Inventor: Masayasu Kitamura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 168 days.

(21) Appl. No.: 17/428,224

(22) PCT Filed: Feb. 5, 2020

(86) PCT No.: PCT/JP2020/004340
§ 371 (c)(1),
(2) Date: Aug. 3, 2021

(87) PCT Pub. No.: WO2020/166447
PCT Pub. Date: Aug. 20, 2020

(65) Prior Publication Data
US 2022/0121231 A1 Apr. 21, 2022

(30) Foreign Application Priority Data

Feb. 13, 2019 (JP) .................................. 2019-023525

(51) Int. Cl.
*G05B 23/02* (2006.01)
*G05D 23/19* (2006.01)
*G06Q 10/20* (2023.01)

(52) U.S. Cl.
CPC ..... *G05D 23/1917* (2013.01); *G05B 23/0208* (2013.01); *G05B 2223/02* (2018.08); *G06Q 10/20* (2013.01)

(58) Field of Classification Search
CPC ............ G05D 23/1917; G05B 23/0208; G05B 2223/02

(Continued)

(56) References Cited

U.S. PATENT DOCUMENTS

| 10,871,756 B2 † | 12/2020 | Johnson |
| 2008/0186160 A1 * | 8/2008 | Kim .................... F24F 11/38 236/51 |
| 2015/0184880 A1 | 7/2015 | Kawamura |
| 2018/0283722 A1 | 10/2018 | Jung et al. |

FOREIGN PATENT DOCUMENTS

| EP | 3 348 925 A1 | 7/2018 |
| JP | 2010-108412 A | 5/2010 |

(Continued)

OTHER PUBLICATIONS

International Preliminary Report of corresponding PCT Application No. PCT/JP2020/004340 dated Aug. 26, 2021.

(Continued)

*Primary Examiner* — Jigneshkumar C Patel
(74) *Attorney, Agent, or Firm* — Global IP Counselors, LLP

(57) ABSTRACT

A device management system includes a device information transmitting apparatus that collects information about a device, and a management apparatus that communicates with the device information transmitting apparatus via a communication network. At least one of the management apparatus and the device information transmitting apparatus includes an anomaly state input unit that receives an anomaly state of the device, and a designating unit that designates, in accordance with the received anomaly state, first information to be used to identify a cause of the anomaly state of the device. The device information transmitting apparatus includes a first information transmitting unit that transmits the first information to the management apparatus.

11 Claims, 7 Drawing Sheets

(58) Field of Classification Search
USPC .......................................................... 700/276
See application file for complete search history.

(56) References Cited

FOREIGN PATENT DOCUMENTS

| JP | 2018-205855 A | 12/2018 |
|----|---------------|---------|
| WO | 2014/064792 A1 | 5/2014 |
| WO | 2017/109992 A1 | 6/2017 |

OTHER PUBLICATIONS

European Search Report of corresponding EP Application No. 20 75 5105.2 dated Mar. 2, 2022.
International Search Report of corresponding PCT Application No. PCT/JP2020/004340 dated Apr. 28, 2020.
Author: David L. Johnson Jr. Title: Building Automation_in_Detroit_ Mosaic_Christian Pages being submitted: 5 Published online sometime between Feb. 8, 2018 and Jul. 6, 2018. Available online at: http://cooljohnson.com/Building-Automation-Systems-Michigan/ Detroit/Mosaic-Christian.html.†
Title: CoolingLogic a Method to Increase HVAC System Efficiency and Decrease Energy Consumption Author: David L. Johnson Jr. Published online on or about: Sep. 24, 2016 Available online at: http://coolinglogic.com/documents/16102106_White_Paper_High_ Resolution_Protected.pdf Printed copy delivered to Daikin on Dec. 27, 2016.†

\* cited by examiner
† cited by third party (a) FIRST ACQUISITION CONDITION A1

| ACQUISITION TIMING | ONCE PER 10 MINUTES | ONCE PER 10 MINUTES | ONCE PER 60 MINUTES |
|---|---|---|---|
| INFORMATION TO BE ACQUIRED | FIRST STATE INFORMATION D1 | SECOND STATE INFORMATION D2 | THIRD STATE INFORMATION D3 |

(b) SECOND ACQUISITION CONDITION A2

| ACQUISITION TIMING | ONCE PER 5 MINUTES | ONCE PER 5 MINUTES | ONCE PER 60 MINUTES |
|---|---|---|---|
| INFORMATION TO BE ACQUIRED | FIRST STATE INFORMATION D1 | SECOND STATE INFORMATION D2 | THIRD STATE INFORMATION D3 |

DEVICE MANAGEMENT SYSTEM WITH IMPROVED ABILITY TO IDENTIFY CAUSE OF ANOMALY IN DEVICE

CROSS-REFERENCE TO RELATED APPLICATIONS

This U.S. National stage application claims priority under 35 U.S.C. § 119(a) to Japanese Patent Application No. 2019-023525, filed in Japan on Feb. 13, 2019, the entire contents of which are hereby incorporated herein by reference.

BACKGROUND

Field of the Invention

The present disclosure relates to a device management system.

Background Information

Hitherto, as disclosed in WO2014/064792, for example, there has been a device management system in which a device information transmitting apparatus that transmits information about a device communicates with a management apparatus via a communication network, and in which the management apparatus determines an anomaly cause when an anomaly of the device is estimated.

SUMMARY

In the above-described device management system, a case is assumed in which an anomaly cause of a device is not identifiable only using information held by the management apparatus. Identification of an anomaly cause in a case where an anomaly of a device is estimated is promoted.

A device management system according to a first aspect includes a device information transmitting apparatus and a management apparatus. The device information transmitting apparatus collects information about a device. The management apparatus communicates with the device information transmitting apparatus via a communication network. The management apparatus and/or the device information transmitting apparatus includes an anomaly state input unit and a designating unit. The anomaly state input unit receives an anomaly state of the device. The designating unit designates first information in accordance with the received anomaly state. The first information is information to be used to identify a cause of the anomaly state. The device information transmitting apparatus includes a first information transmitting unit. The first information transmitting unit transmits the first information.

Accordingly, the first information to be used to identify the cause of the anomaly state in the management apparatus is designated by the designating unit in accordance with the received anomaly state. The first information is transmitted from the device information transmitting apparatus to the management apparatus. As a result, even in a case where an anomaly cause of the device is not identifiable only using the information held by the management apparatus, identification of the anomaly cause is promoted.

The "first information" herein may include not only a single piece of information but also a plurality of pieces of information.

The "management apparatus" herein is a computer that manages the device. The management apparatus is, for example, a super computer, a work station, a personal computer, a tablet device, a smartphone, or the like. For example, the management apparatus may be constituted by a plurality of computers and devices connected by a network.

A device management system according to a second aspect is the device management system according to the first aspect, in which the device information transmitting apparatus includes a first information storage unit that accumulates the first information. Accordingly, the first information is accumulated in the device information transmitting apparatus. As a result, when an anomaly of the device is estimated, it is possible to transmit a plurality of pieces of first information from the device information transmitting apparatus to the management apparatus, and identification of an anomaly cause is promoted.

A device management system according to a third aspect is the device management system according to the first aspect or the second aspect, in which the management apparatus includes a first information requesting unit. The first information requesting unit transmits a first information request signal to the device information transmitting apparatus. The first information request signal is a signal of requesting transmission of the first information designated by the designating unit. The first information transmitting unit transmits the first information in response to the first information request signal. Accordingly, the first information based on the request from the management apparatus is transmitted from the device information transmitting apparatus to the management apparatus.

A device management system according to a fourth aspect is the device management system according to the third aspect, in which the device information transmitting apparatus includes an operation information transmitting unit. The operation information transmitting unit transmits operation information to the management apparatus at a predetermined timing. The operation information is information specifying an operation state of the device. The management apparatus includes a management apparatus storage unit. The management apparatus storage unit stores the operation information that has been acquired. The first information requesting unit transmits the first information request signal in a case where an anomaly cause is not identifiable based on the operation information stored in the management apparatus storage unit.

Accordingly, in a case where an anomaly of the device is estimated and in a case where an anomaly cause is not identifiable based on the operation information held by the management apparatus, it is possible to transmit operation information from the device information transmitting apparatus to the management apparatus. Accordingly, the management apparatus is appropriately able to request first information that is not held only when it is necessary, and the load of communication is reduced.

A device management system according to a fifth aspect is the device management system according to the fourth aspect, in which the first information requesting unit requests, in the first information request signal, the first information which is the operation information collected at a shorter interval than the operation information stored in the management apparatus storage unit and/or information that is not held by the management apparatus but is held by the device information transmitting apparatus. Accordingly, identification of an anomaly cause is further promoted.

A device management system according to a sixth aspect is the device management system according to any one of the third aspect to the fifth aspect, in which the first information request signal includes information designating an ID and data item of the device related to the first information that is requested.

A device management system according to a seventh aspect is the device management system according to any one of the first aspect to the third aspect, in which the device information transmitting apparatus includes an operation information collecting unit and an operation information transmitting unit. The operation information collecting unit collects operation information under a predetermined first condition. The operation information is information specifying an operation state of the device. The operation information transmitting unit transmits the collected operation information to the management apparatus. Accordingly, in the device information transmitting apparatus, operation information is collected under the first condition.

A device management system according to an eighth aspect is the device management system according to the seventh aspect, in which the management apparatus includes a changing unit that changes the first condition. Accordingly, the management apparatus is capable of flexibly determining, in accordance with a situation, the manner of collecting operation information in the device information transmitting apparatus.

A device management system according to a ninth aspect is the device management system according to the eighth aspect, in which the management apparatus includes a management apparatus storage unit. The management apparatus storage unit stores the operation information that has been acquired. The changing unit changes the first condition in a case where an anomaly cause is not identifiable based on the operation information stored in the management apparatus storage unit. Accordingly, in a case where an anomaly cause is not identifiable based on the operation information held by the management apparatus, it is possible to change the manner of collecting operation information in the device information transmitting apparatus.

A device management system according to a tenth aspect is the device management system according to any one of the first aspect to the ninth aspect, in which the device includes at least any one of an air conditioning device, a ventilation device, a humidity adjusting device, and a refrigeration device. Accordingly, when an anomaly of any one of the air conditioning device, the ventilation device, the humidity adjusting device, and the refrigeration device is estimated, identification of an anomaly cause is promoted.

BRIEF DESCRIPTION OF DRAWINGS

FIG. 4 is a schematic diagram illustrating an example of acquisition conditions related to collecting operation information from an air conditioner by a control terminal.

DETAILED DESCRIPTION OF EMBODIMENT(S)

First Embodiment

Hereinafter, a device management system 1 according to a first embodiment of the present disclosure will be described. The following embodiment is a specific example, does not limit the technical scope, and can be appropriately changed without deviating from the gist.

(1) Overall Configuration

Figure 1:
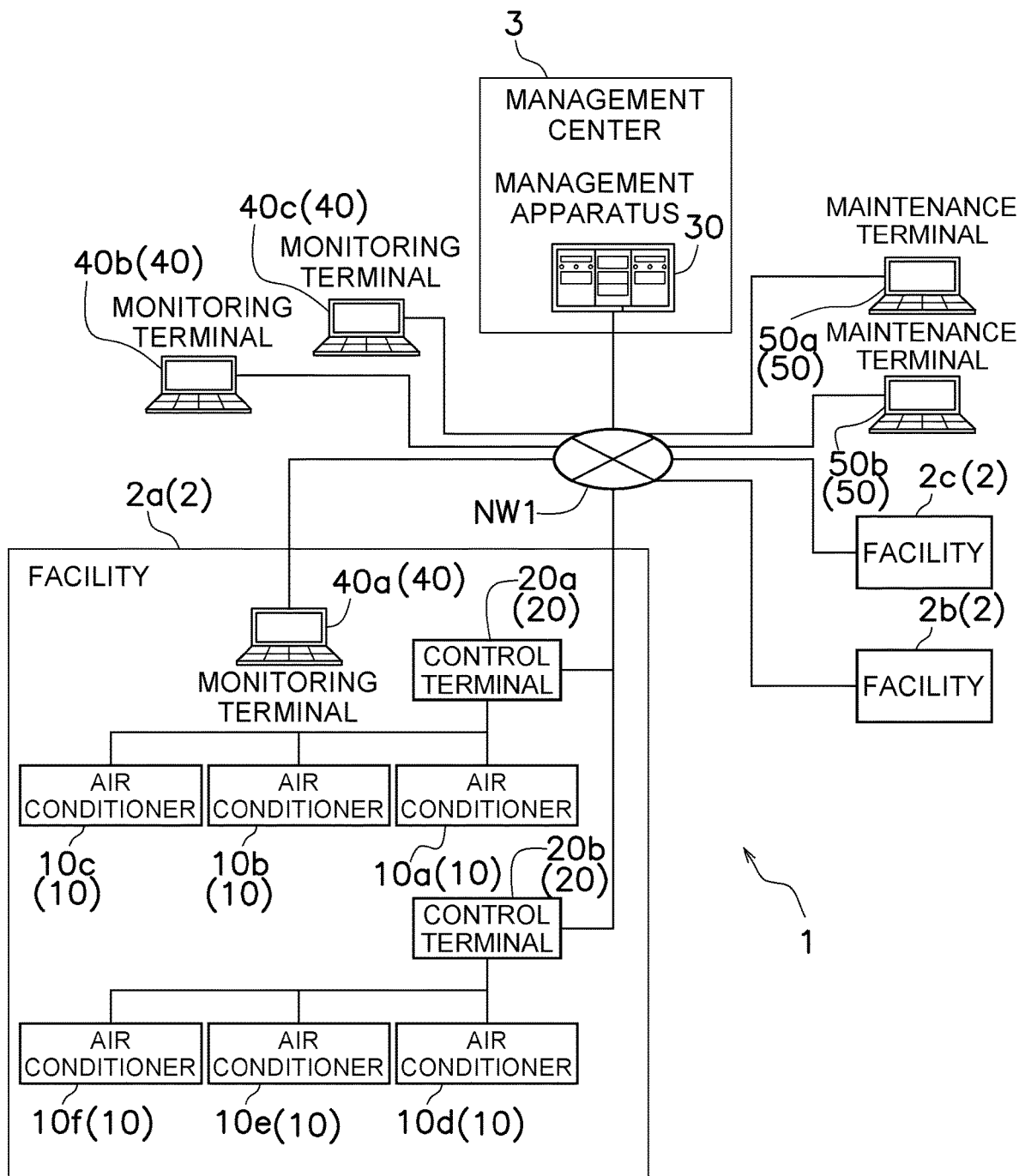
FIG. 1 is a schematic diagram illustrating the configuration of a device management system.

FIG. 1 is a schematic diagram illustrating the configuration of the device management system 1 according to one embodiment of the present disclosure. In the following description, a plurality of apparatuses having similar functions are denoted by the same reference numerals when a common description is given about the apparatuses. When one of a plurality of apparatuses having similar functions is described by being distinguished from the others, a lower-case alphabetic letter is attached to the reference numeral denoting the apparatus. For example, control terminals 20a to 20c, which are apparatuses having similar functions, will be referred to as control terminals 20 when a common description is given about them. Although the letters "a" to "c" and the like are attached to reference numerals for convenience of description, these letters represent an exemplary number, and the number is not limited thereto.

The device management system 1 is a system in which a single management apparatus 30 manages many devices. Here, the management apparatus 30 is installed in a central management center 3. There are many facilities 2 (2a to 2c) in a jurisdiction area of the central management center 3. The facilities 2 are, for example, an office building, a commercial building, and a condominium. One or a plurality of air conditioners 10 (10a to 10i), which are an example of devices to be managed, are installed in each of the facilities 2. Each of the air conditioners 10 is connected to any one of the plurality of control terminals 20 (20a and 20b). In the device management system 1, the individual control terminals 20 and the management apparatus 30 communicate various information including device information, which will be described below, and thus the plurality of air conditioners 10 are managed. Specifically, the management apparatus 30 acquires operation information (described below) about corresponding air conditioners 10 from each control terminal 20, thereby determining the presence or absence of an anomaly and the details of the anomaly of each air conditioner 10.

The management apparatus 30 is connected to a plurality of monitoring terminals 40 (40a to 40c) and a plurality of maintenance terminals 50 (50a and 50b) via a communication network NW1. When an anomaly notice is made regarding any one of the air conditioners 10, the management apparatus 30 notifies an operator or the like of the monitoring terminals 40 or the maintenance terminals 50 that the anomaly notice has been made.

The communication network NW1 includes a wide area network (WAN) connected to a plurality of properties. For example, the communication network NW1 includes the Internet.

The number of control terminals 20, the number of monitoring terminals 40, and/or the number of maintenance terminals 50 can be changed as appropriate. Also, the number of facilities 2 and/or the number of central management centers 3 can be changed as appropriate.

(2) Management Target (Device) in Device Management System 1

Hereinafter, an "air conditioner" that cools or warms a target space will be described as an example of a device serving as a management target in the device management system 1 according to the present embodiment. Note that the management target in the device management system 1 according to the present embodiment is not limited to an air conditioner, and any device having the following feature can be adopted. For example, a ventilation device, a humidity adjusting device, an air handling unit, a chiller unit, and/or another refrigeration device or the like may be adopted as a "device".

Figure 2:
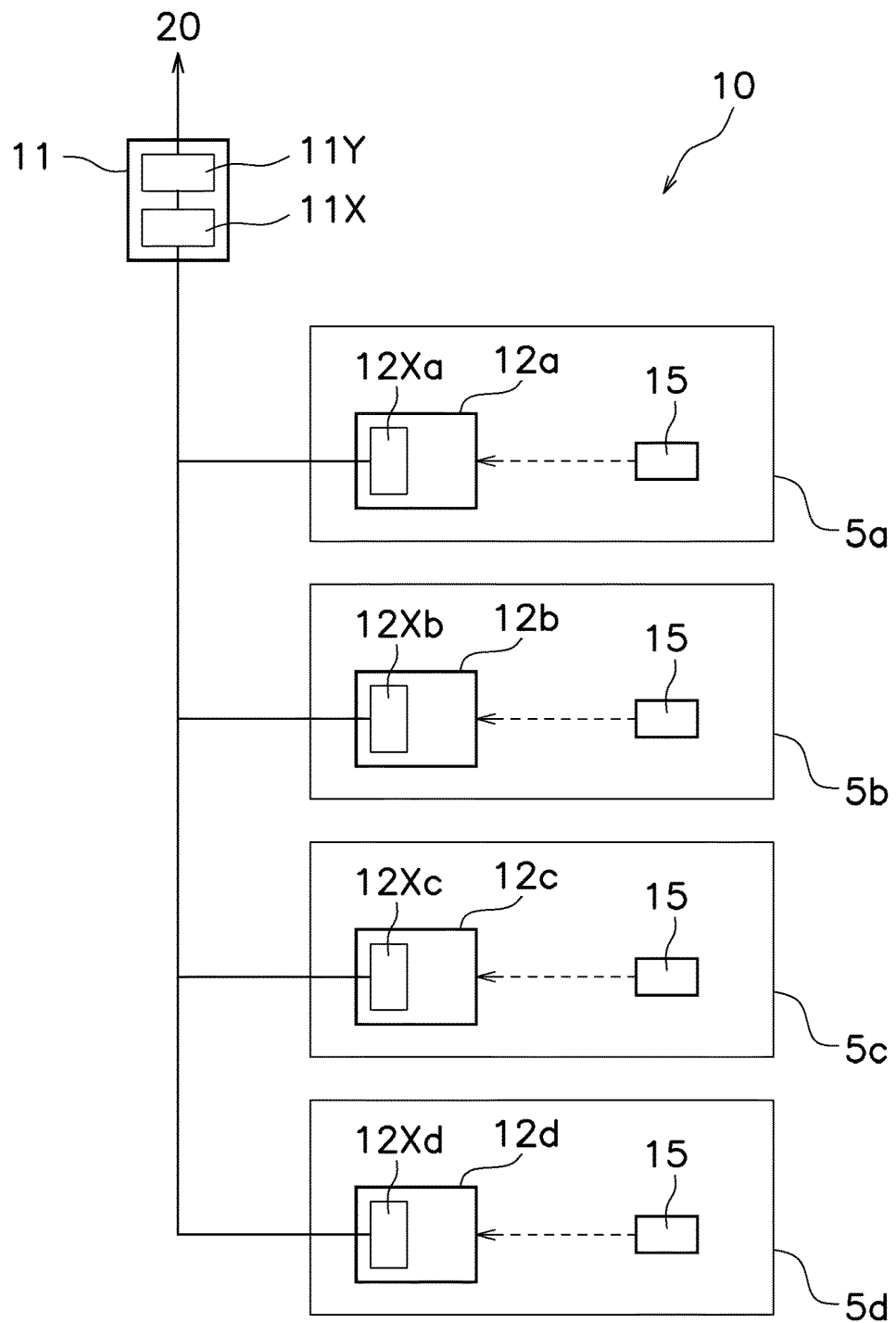
FIG. 2 is a schematic diagram illustrating the configuration of an air conditioner.

FIG. 2 is a schematic diagram illustrating the configuration of the air conditioner 10 according to the present embodiment. The air conditioner 10 includes a refrigerant circuit constituted by a compressor, a heat exchanger, and the like which are not illustrated. The air conditioner 10 includes an outdoor unit 11 and a plurality of indoor units 12 (12a to 12d). The outdoor unit 11 is connected to the individual indoor units 12 through dedicated communication lines. The outdoor unit 11 includes an outdoor unit control unit 11X. The indoor units 12a to 12d include indoor unit control units 12Xa to 12Xd, respectively. The air conditioner 10 has various sensors that are appropriately attached to predetermined positions. These sensors detect at least any one of a room temperature, an ambient outside temperature, a temperature and pressure of refrigerant sucked into the compressor, a temperature and pressure of refrigerant discharged from the compressor, a temperature of refrigerant in an evaporator, and a temperature of refrigerant in a condenser. On the basis of detected values of the various sensors, the outdoor unit control unit 11X and the indoor unit control units 12X cooperate with each other to control the operations of individual parts of the air conditioner 10. The air conditioner 10 is operated on the basis of control information input from an operation terminal 15, such as a remote controller and/or an operation panel, and control information input from the external monitoring terminal 40 via the communication network NW1.

The outdoor unit 11 is a device that functions as a heat source of the refrigerant circuit. The outdoor unit 11 includes a connection unit 11Y mounted therein. The outdoor unit control unit 11X transmits information to and receives information from the control terminal 20 via the connection unit 11Y. The outdoor unit 11 is installed, for example, on a roof, in an underground room, or the like.

The indoor unit 12 is operated by the operation terminal 15 installed indoors. The operation terminal 15 is constituted by, for example, a remote controller and an operation panel or the like attached indoors. Here, the plurality of indoor units 12 connected to the single outdoor unit 11 are operated while individually being associated with one or a plurality of operation terminals 15. A human detection sensor or the like that detects the presence of a person may be mounted on the indoor unit 12. The indoor units 12a to 12d are installed in installation spaces 5a to 5d, such as a plurality of floors or a plurality of rooms of the facility 2, in a dispersed manner.

(3) Detailed Configuration of Device Management System 1

Figure 3:
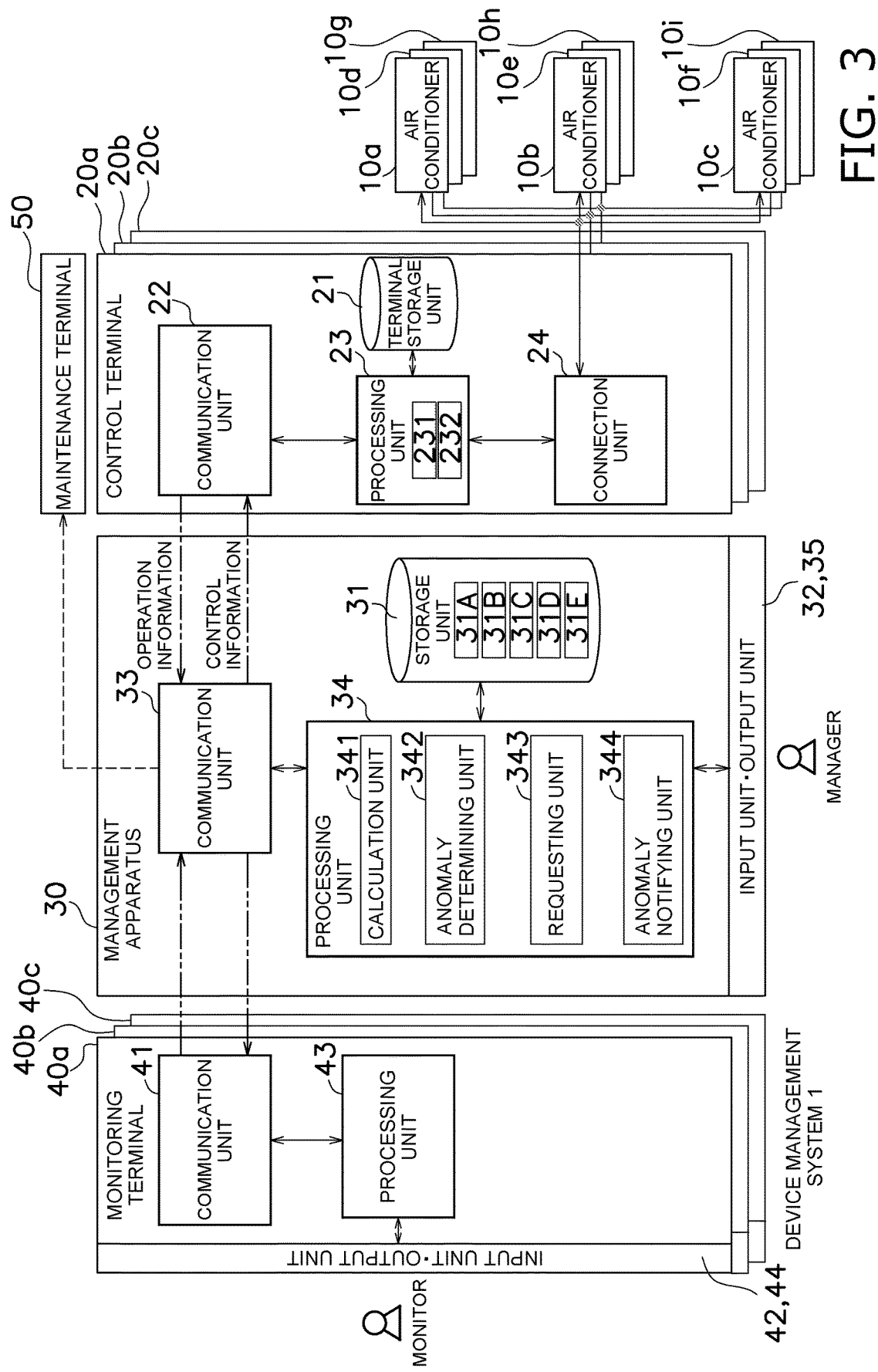
FIG. 3 is a schematic diagram illustrating functional blocks of individual apparatuses constituting a device management system according to a first embodiment.

FIG. 3 is a schematic diagram illustrating functional blocks of the individual apparatuses constituting the device management system 1 according to the present embodiment.

(3-1) Control Terminal (Device Information Transmitting Apparatus)

The control terminal 20 connects to the outdoor unit control unit 11X, thereby controlling the air conditioner 10. The control terminal 20 is a computer for controlling the air conditioner 10. The control terminal 20 may be constituted by a plurality of computers and devices connected by a network. As illustrated in FIG. 3, each control terminal 20 includes a terminal storage unit 21, a communication unit 22, a processing unit 23, and a connection unit 24.

The terminal storage unit 21 ("first information storage unit") stores various pieces of information and is constituted by a nonvolatile memory, a volatile memory, and the like. For example, the terminal storage unit 21 stores a program for executing various functions of the control terminal 20. The terminal storage unit 21 stores "device information" transmitted between the control terminal 20 and the management apparatus 30. The terminal storage unit 21 accumulates, in accordance with the capacity thereof, a plurality of pieces of operation information including detailed operation information described below. The terminal storage unit 21 stores an "acquisition condition" related to acquisition of device information from the corresponding air conditioner 10. The terminal storage unit 21 stores a "communication condition" related to transmission of the device information.

The device information is a plurality of types of information about the air conditioner (device) 10, which is a management target, and is broadly classified into, for example, "operation information" indicating the state of the air conditioner 10 and "control information" for controlling various states of the air conditioner 10. The operation information includes information specifying an operation state of the air conditioner 10. Specifically, the operation information includes a plurality of types of information, for example, first operation information D1, second operation information D2, and third operation information D3. The operation information is not limited to that described above and can be set in any manner by a manager or the like.

In the present embodiment, the first operation information D1 includes information such as an anomaly notice of providing, when it is estimated that an anomaly has occurred in a device, for example, a notification of an estimated anomaly. In other words, the first operation information D1 is information indicating that an anomaly of the air conditioner 10 is estimated ("anomaly information"). The first operation information D1 includes information specifying an estimated anomaly state when it is estimated that an anomaly has occurred. For example, the first operation information D1 includes a code of a device in which an anomaly is estimated, a code identifying an estimated anomaly item, data uniquely identifying a device as a transmission source, and the like.

The second operation information D2 includes information specifying an operation state of the air conditioner 10 or the history thereof. For example, the second operation information D2 includes information of a state of an actuator included in the air conditioner 10 or the history thereof, and/or detected values of various sensors installed in the air conditioner 10 and the history thereof. The actuator included in the air conditioner 10 is, for example, at least any one of a compressor, a fan, and an electronic expansion valve or the like. A sensor included in the air conditioner 10 is a temperature sensor and/or a pressure sensor that detects at least any one of a temperature or pressure of refrigerant discharged from the compressor, a temperature or pressure of refrigerant sucked into the compressor, and a temperature or pressure of refrigerant flowing in the evaporator and/or the condenser; a temperature sensor for detecting an outdoor temperature or indoor temperature; or the like.

The third operation information D3 is information for grasping characteristics of a user. For example, the third operation information D3 corresponds to a history or the like of operation details of the operation terminal 15.

The terminal storage unit 21 stores communication conditions related to transmission of the plurality of types of operation information in association with each air conditioner 10.

An acquisition condition (first condition) defines, regarding the corresponding air conditioner 10, the contents of operation information to be acquired, the timing to acquire the operation information, and so forth. The acquisition condition includes, for example, a first acquisition condition A1 and a second acquisition condition A2, as illustrated in FIG. 4. The first acquisition condition A1 in FIG. 4 defines that the first operation information D1 is acquired at a frequency of once per 10 minutes, that the second operation information D2 is acquired at a frequency of once per 10 minutes, and that the third operation information D3 is acquired at a frequency of once per 60 minutes. The second acquisition condition A2 in FIG. 4 defines that the first operation information D1 is acquired at a frequency of once per 5 minutes, that the second operation information D2 is acquired at a frequency of once per 5 minutes, and that the third operation information D3 is acquired at a frequency of once per 60 minutes.

As is indicated in the relationship between the first operation information D1 or the second operation information D2 and the third operation information D3 in FIG. 4, the collection timing may vary between items of operation information in the acquisition conditions. In relation to this, the sampling interval of each piece of data acquired from the air conditioner 10 may be changed in accordance with the degree of importance thereof. In other words, data having a high degree of importance can be collected at a shorter interval than data having a lower degree of importance. Thus, the amount of communication between the control terminal 20 and the air conditioner 10 can be reduced. In relation to this, a load related to communication processing is reduced in the control terminal 20 and the air conditioner 10.

A communication condition is a condition related to communication between the management apparatus 30 and the control terminal 20. For example, a communication condition individually defines the timing to transmit or receive information, the number of transmissions or receptions of information, the contents of information that is transmitted or received, or the like, regarding communication between the management apparatus 30 and each control terminal 20. For example, one communication condition defines that the first operation information D1, the second operation information D2, and the third operation information D3 are transmitted from the control terminal 20 to the management apparatus 30 at a frequency of once per hour regarding the corresponding air conditioner 10.

The acquisition conditions and communication conditions stored in the terminal storage unit 21 can be updated as appropriate from the management apparatus 30. For example, the acquisition conditions and communication conditions stored in the terminal storage unit 21 can be updated as appropriate from the management apparatus 30 or another terminal. For example, the acquisition conditions and communication conditions stored in the terminal storage unit 21 are updated in response to an instruction from the management apparatus 30.

The communication unit 22 communicates with an external network including the communication network NW1. With the function of the communication unit 22, transmission and reception of various commands and various pieces of data are performed between the control terminal 20 and the management apparatus 30.

The processing unit 23 executes various information processing operations. The processing unit 23 includes an acquisition processing unit 231 and a transmission processing unit 232.

The acquisition processing unit 231 ("first information collecting unit") collects operation information from the corresponding air conditioner 10 at a predetermined timing via the connection unit 24 under an acquisition condition. The acquisition processing unit 231 stores the acquired operation information in the terminal storage unit 21.

The transmission processing unit 232 ("operation information transmitting unit", "first information transmitting unit") controls communication between the control terminal 20 and the management apparatus 30 via the communication unit 22. For example, the transmission processing unit 232 transmits operation information acquired by the acquisition processing unit 231 from the air conditioner 10 to the management apparatus 30 at a predetermined timing under a communication condition. In response to receipt of a signal requesting transmission of operation information as control information from the management apparatus 30, the transmission processing unit 232 transmits the operation information designated in the request to the management apparatus 30. For example, in response to receipt of a detailed operation information request signal described below from the management apparatus 30, the transmission processing unit 232 transmits the detailed operation information (described below) designated in the signal to the management apparatus 30. In other words, the transmission processing unit 232 transmits the detailed operation information to the management apparatus 30 on the basis of designation by an anomaly determining unit 342 (described below) of the management apparatus 30.

The control terminal 20 including the above-described processing unit 23 corresponds to a "device information transmitting apparatus" that transmits "device information" about a predetermined device to the management apparatus 30.

The connection unit 24 is connected to the connection unit 11Y of the outdoor unit 11. The control terminal 20 is capable of transmitting instruction information to the outdoor unit control unit 11X and acquiring operation information from the outdoor unit control unit 11X, via the connection unit 24.

(3-2) Management Apparatus

The management apparatus 30 connects to each of the control terminal 20 and the monitoring terminal 40 via the communication network NW1 and manages operation states and so forth of the plurality of air conditioners 10. The management apparatus 30 communicates with the control terminal 20 via the communication network NW1. The management apparatus 30 is a computer that manages the air conditioner 10 and is, for example, a super computer, a work station, a personal computer, a tablet device, a smartphone, or the like. For example, the management apparatus 30 may be constituted by a plurality of computers and devices connected by a network.

As illustrated in FIG. 3, the management apparatus 30 includes a storage unit 31, an input unit 32, a communication unit 33, a processing unit 34, and an output unit 35.

The storage unit 31 ("management apparatus storage unit") stores various pieces of information and includes a read only memory (ROM), a random access memory (RAM), and/or a hard disk or the like. Here, the storage unit 31 includes a centralized management storage unit 31A, an operation information storage unit 31B, a control information storage unit 31C, an acquisition condition storage unit 31D, and a communication condition storage unit 31E. The storage unit 31 stores a program for executing various functions of the management apparatus 30.

The centralized management storage unit 31A individually stores information about the plurality of air conditioners 10 managed by the management apparatus 30. For example, the centralized management storage unit 31A individually stores information about the facility 2 in which the individual air conditioners 10 are installed, information about the outdoor unit 11 and the installation spaces 5a to 5d of the indoor units 12a to 12d in the facility 2, information about a monitor of the individual air conditioners 10, the individual air conditioners 10 corresponding to each control terminal 20, and so forth.

The operation information storage unit 31B individually stores various pieces of operation information received from the control terminal 20 in association with the individual air conditioners 10. The operation information stored in the operation information storage unit 31B includes detailed operation information received from the control terminal 20.

The control information storage unit 31C individually stores control information for the individual air conditioners 10 input by a manager who operates the management apparatus 30, control information corresponding to a request from the monitoring terminal 40 described below to the individual air conditioners 10, and so forth.

The acquisition condition storage unit 31D individually stores "acquisition conditions" related to the individual control terminals 20. The information stored in the acquisition condition storage unit 31D includes information of the acquisition conditions stored in the terminal storage unit 21 of each control terminal 20.

The communication condition storage unit 31E individually stores "communication conditions" related to the individual control terminals 20. The information stored in the communication condition storage unit 31E includes information of the communication conditions stored in the terminal storage units 21 of the individual control terminals 20a to 20c. The communication conditions for the individual control terminals 20 can be changed by appropriately rewriting the information stored in the communication condition storage unit 31E of the management apparatus 30.

The storage unit 31 is capable of storing any information other than the above-described various storage units.

The input unit 32 is an interface for inputting information to the management apparatus 30. For example, the input unit 32 is implemented by a keyboard, a mouse, and/or a touch screen or the like. For example, the input unit 32 enables information to be input to various reception screens. Thus, a manager is able to input control information for each air conditioner 10 and input information for changing various settings, via the input unit 32.

The communication unit 33 ("anomaly state input unit") is an interface for communicating with the control terminal 20 and the monitoring terminal 40. Specifically, the communication unit 33 receives operation information from the control terminal 20. For example, the communication unit 33 transmits control information to the control terminal 20. For example, the communication unit 33 receives a "request" or other information from the monitoring terminal 40 or the control terminal 20. The operation information and other information received by the communication unit 33 are stored in the storage unit 31.

The processing unit 34 executes various information processing operations in the management apparatus 30 and is constituted by a central processing unit (CPU), a cache memory, and so forth. Here, the processing unit 34 has functions of a calculation unit 341, an anomaly determining unit 342, a requesting unit 343, and an anomaly notifying unit 344.

The calculation unit 341 executes calculation regarding information processing that is based on information received by the communication unit 33. For example, the calculation unit 341 generates various pieces of management information or the like in accordance with operation information received from the control terminal 20. The calculation unit 341 executes processing in response to a request from the monitoring terminal 40 and generates monitoring information or the like indicating a result of the processing.

The anomaly determining unit 342 ("designating unit") executes a process (anomaly determination process) of determining, on the basis of each piece of operation information received from the control terminal 20, the details of an anomaly (including the presence or absence of an anomaly and a state of an anomaly) regarding the corresponding air conditioner 10. An "anomaly" is a state in which the air conditioner 10 does not normally operate. For example, an "anomaly" is a state in which the pressure or temperature of refrigerant is higher than or lower than a reference value. For example, an "anomaly" is a state in which a discharge temperature or discharge pressure of refrigerant discharged from the compressor is higher than or lower than a value that is normally assumed in the relationship with another parameter. For example, an "anomaly" is a state in which a suction temperature or suction pressure of refrigerant discharged from the compressor is lower than or higher than a value that is normally assumed in the relationship with another parameter. For example, an "anomaly" is a state in which a condensation temperature, a condensation pressure, or the degree of subcooling of refrigerant in the condenser is higher than or lower than a value that is normally assumed in the relationship with another parameter. For example, an "anomaly" is a state in which an evaporation temperature, an evaporation pressure, or the degree of superheating of refrigerant in the evaporator is higher than or lower than a value that is normally assumed in the relationship with another parameter.

The "details of an anomaly" include a device or portion in which an anomaly has occurred, a direct cause of an anomaly, or the like. An example of the details of an anomaly is a failure or malfunction of an actuator such as a compressor, an electronic expansion valve, or a fan, or a failure or malfunction of a measuring device such as a sensor. Another example of the details of an anomaly is breakage of a member forming a refrigerant flow path, such as a refrigerant pipe, a flow splitter, or each heat exchanger. Another example of the details of an anomaly is a failure or malfunction of a device constituting a communication system or a device constituting a control unit of an actuator. Another example of the details of an anomaly is, for example, refrigerant leakage, an insufficient amount of supplied refrigerant, or the like.

The anomaly determination process includes a first anomaly determination process of determining, on the basis of operation information, the details of an anomaly regarding the air conditioner 10 that is assumed to have an anomaly, and a second anomaly determination process that is performed after the first anomaly determination process in accordance with a result of the first anomaly determination process.

For example, in a case where an anomaly is assumed on the basis of the first operation information D1 or the second operation information D2 received from the control terminal 20, the anomaly determining unit 342 performs a first anomaly determination process to determine the details of the anomaly of the corresponding air conditioner 10. For example, in the first anomaly determination process, the anomaly determining unit 342 determines, regarding the anomaly estimated on the basis of the first operation information D1 and/or the second operation information D2, the presence or absence of the anomaly and the details of the anomaly on the basis of other information such as the second operation information D2 or the third operation information D3. For example, in a case where an anomaly related to a discharge temperature or pressure of the compressor is assumed on the basis of the first operation information D1, the anomaly determining unit 342 determines, in the first anomaly determination process, the presence or absence of the anomaly and the details of the anomaly (an anomaly portion, an anomaly cause, the level of anomaly or the degree of necessity of repair) or the like by using history information of various parameters, such as the number of rotations of the compressor, the opening degree of the expansion valve, the number of rotations of each fan, and/or detected values of individual sensors, on the basis of the second operation information D2. The individual parameters used in the anomaly determination process are appropriately selected in accordance with a situation.

In the first anomaly determination process, in a case where the details of the anomaly are not sufficiently identifiable on the basis of the operation information that is held, the anomaly determining unit 342 requests the requesting unit 343 to acquire further operation information (hereinafter referred to as "detailed operation information") about the corresponding air conditioner 10. The detailed operation information to be requested is appropriately designated by the anomaly determining unit 342 in accordance with an estimated anomaly state, a result of the first anomaly determination process, or the like. In other words, the detailed operation information is information that is not held by the management apparatus 30. The detailed operation information is information used to identify the details of an anomaly, such as an anomaly cause, when an anomaly of a device is estimated. The detailed operation information may include not only a single piece of information but also a plurality of pieces of information.

For example, in the first anomaly determination process, in a case where an anomaly related to a discharge temperature or pressure of the compressor is assumed on the basis of the first operation information D1 and in a case where an anomaly portion or an anomaly cause is not identifiable because individual parameters specified by history information, such as the number of rotations of the compressor, the opening degree of the expansion valve, the number of rotations of each fan, and/or detected values of individual sensors, are normal on the basis of the second operation information D2, the anomaly determining unit 342 designates operation information that is not stored in the storage unit 31 regarding the corresponding air conditioner 10 and requests the requesting unit 343 to acquire the designated detailed operation information. The contents of detailed operation information for which acquisition is requested to the requesting unit 343 are appropriately selected in accordance with a situation. For example, the detailed operation information is operation information acquired from the air conditioner 10 as a target of the anomaly determination process between the timing at which the latest operation information about the air conditioner 10 stored in the storage unit 31 is acquired and the timing at which the second latest operation information is acquired. For example, the detailed operation information is past operation information older than the operation information used in the first anomaly determination process.

The anomaly determining unit 342 waits for a predetermined time after the requesting. If the designated detailed operation information is stored in the storage unit 31, the anomaly determining unit 342 executes a second anomaly determination process on the basis of the detailed operation information. In the second anomaly determination process, the anomaly determining unit 342 determines the details of the anomaly of the target air conditioner 10 on the basis of the detailed operation information that is not used in the first anomaly determination process. For example, in the second anomaly determination process, the anomaly determining unit 342 identifies the presence or absence of the anomaly, the portion of the anomaly, the cause of the anomaly, the degree of the anomaly, and/or the degree of necessity of repair on the basis of the second operation information D2, the third operation information D3, or the like included in the detailed operation information. The individual parameters used in the second anomaly determination process are appropriately selected in accordance with a situation.

The requesting unit 343 ("requesting unit") performs a process (detailed operation information request process) of requesting detailed operation information ("first information") to the corresponding control terminal 20 in a case where the anomaly determination process is unable to determine an anomaly. Specifically, in the detailed operation information request process, the requesting unit 343 generates a signal (detailed operation information request signal) of requesting the operation information designated on the basis of the request from the anomaly determining unit 342 to the corresponding control terminal 20. The detailed operation information request signal includes information designating an ID and data item of the air conditioner 10 related to the detailed operation information that is requested. The requesting unit 343 transmits the generated detailed operation information request signal to the corresponding control terminal 20 via the communication unit 33. In other words, in a case where an anomaly of the air conditioner 10 is estimated and in a case where the details of the anomaly are not identifiable on the basis of the operation information stored in the storage unit 31, the requesting unit 343 transmits, to the corresponding control terminal 20, a detailed operation information request signal ("first information request signal") of requesting transmission of the detailed operation information designated by the anomaly determining unit 342.

In accordance with a result of the anomaly determination process by the anomaly determining unit 342, the anomaly notifying unit 344 executes a process (notification process)

of creating information (anomaly notification information) for notifying a manger or a monitor of the presence or absence of an anomaly and the details of the anomaly of the air conditioner 10. The anomaly notifying unit 344 outputs, from the output unit 35, the created anomaly notification information. The anomaly notifying unit 344 transmits the created anomaly notification information to the corresponding monitoring terminal 40 and/or the maintenance terminal 50 via the communication unit 33. Accordingly, the manager, the monitor, or a maintenance worker is able to individually grasp the presence or absence of the anomaly and the details of the anomaly of each air conditioner 10.

The notification process for the first anomaly determination process is executed in a case where the details of an anomaly are identifiable, whereas the notification process for the second anomaly determination process is executed regardless of whether the details of an anomaly are identifiable.

The output unit 35 outputs various pieces of information and is constituted by a display, a speaker, and the like of various types. For example, the output unit 35 outputs an input screen or the like for receiving input of various pieces of information. For example, the output unit 35 outputs anomaly notification information created by the anomaly notifying unit 344. The various pieces of information output by the output unit 35 can be output to the monitoring terminal 40 and the maintenance terminal 50 via the communication network NW1.

(3-3) Monitoring Terminal

The monitoring terminal 40 monitors the state of the air conditioner 10 on the basis of anomaly notification information received from the management apparatus 30. The monitoring terminal 40 is operated by, for example, a monitor given the right to execute various control operations on the air conditioner 10.

The monitoring terminal 40 includes a communication unit 41, an input unit 42, a processing unit 43, and an output unit 44.

The communication unit 41 connects to the management apparatus 30 via the communication network NW1 and transmits a request or command for the air conditioner 10 to the management apparatus 30. The communication unit 41 receives various pieces of information from the management apparatus 30 and other devices.

The input unit 42 receives a request to be transmitted to the management apparatus 30, the control terminal 20, or the like. For example, the monitor is able to input, via the input unit 42, a command to be transmitted to the management apparatus 30 or the control terminal 20. For example, the manager is able to set a reference value for an anomaly determination process via the input unit 42.

The processing unit 43 executes various information processing operations in the monitoring terminal 40.

The output unit 44 outputs information on the basis of various pieces of information received from the management apparatus 30. For example, the output unit 44 outputs anomaly notification information received by the communication unit 41.

The monitor corresponds to an owner of the facility 2, a manager of the facility 2, a user of the facility 2, a manufacturer of the air conditioner 10, a seller of the air conditioner 10, or the like. The monitor is given a right that varies according to the type of the monitor. Thus, the type of request that can be input to the air conditioner 10 varies according to the level of the right given to each monitoring terminal 40. Setting information of the level of the right is stored in the centralized management storage unit 31A of the management apparatus 30.

(3-4) Maintenance Terminal

The maintenance terminal 50 is a terminal operated by a maintenance worker of the air conditioner 10. The maintenance terminal 50 receives anomaly notification information from the management apparatus 30. Accordingly, the maintenance worker is able to diagnose the air conditioner 10 in which an anomaly has been detected, and cope with a failure or the like.

(4) Detailed Operation Information Request Process and Anomaly Determination Process in Device Management System 1

Figure 5:
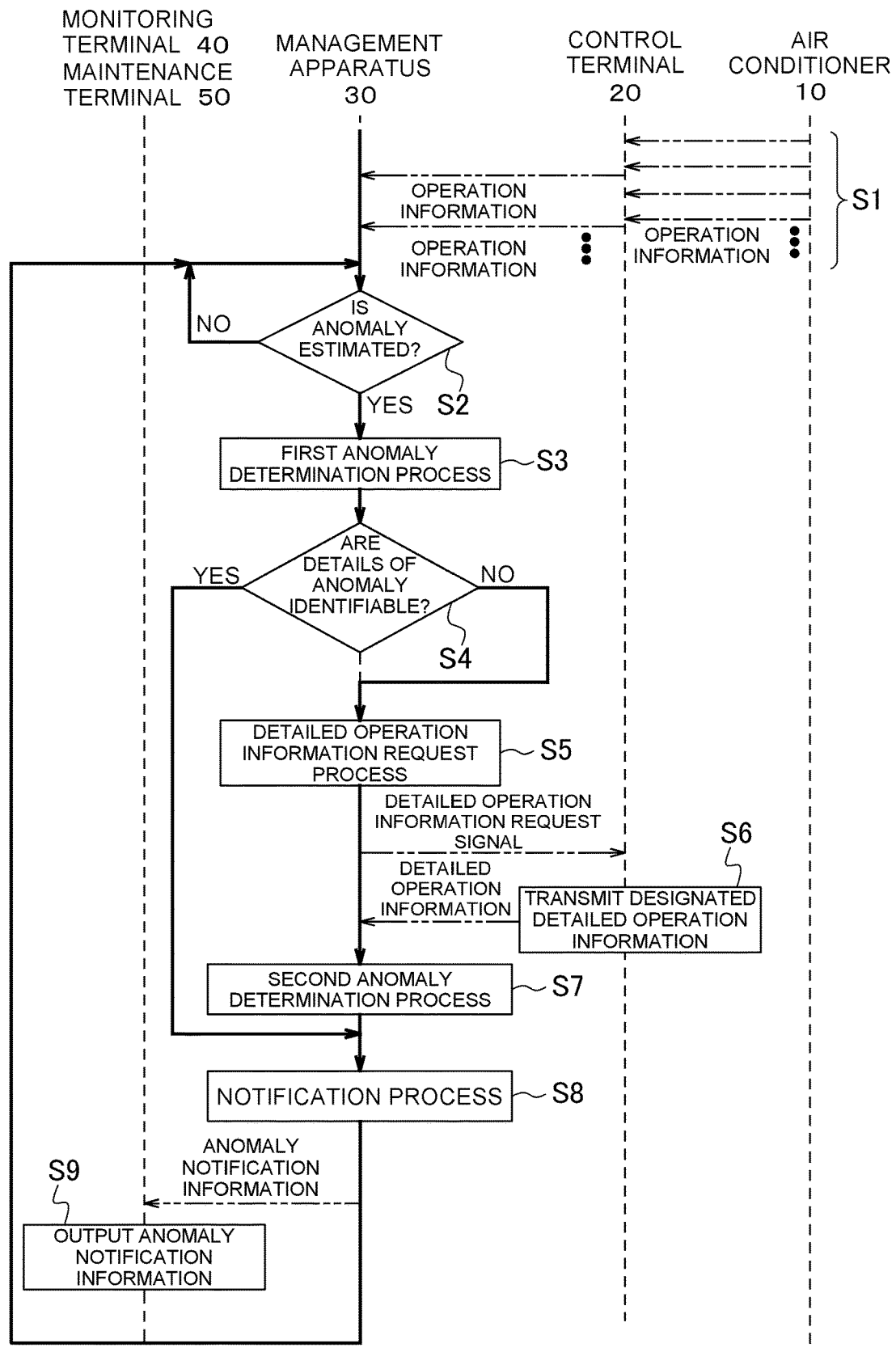
FIG. 5 is a schematic diagram for describing a flowchart of a process in the device management system according to the first embodiment.

FIG. 5 is a schematic diagram for describing a flowchart of a process in the device management system 1 according to the present embodiment. FIG. 5 illustrates a flowchart of a process in the relationship between a single air conditioner 10, a single management apparatus 30, a single control terminal 20, and a single monitoring terminal 40. However, the process illustrated in FIG. 5 is individually performed between the management apparatus 30, and each control terminal 20 and/or each monitoring terminal 40.

While the device management system 1 is operating, the control terminal 20 acquires operation information from the air conditioner 10 under an acquisition condition, and the control terminal 20 transmits the operation information to the management apparatus 30 under a communication condition (S1).

In a case where an anomaly of the corresponding air conditioner 10 is estimated on the basis of the operation information transmitted by the control terminal 20 (S2—Yes), the management apparatus 30 that receives the operation information executes a first anomaly determination process (S3). In a case where an anomaly of the corresponding air conditioner 10 is not estimated on the basis of the operation information transmitted by the control terminal 20 (S2—No), the management apparatus 30 does not execute a first anomaly determination process on the air conditioner 10.

In the first anomaly determination process, in a case where the details of the anomaly are not identifiable on the basis of operation information that is held (S4—No), the management apparatus 30 executes a detailed operation information request process and transmits a detailed operation information request signal to the corresponding control terminal 20 (S5). On the other hand, in the first anomaly determination process, in a case where the details of the anomaly are identifiable on the basis of operation information that is held (S4—Yes), the management apparatus 30 executes a notification process, outputs a determination result from the output unit 35, and transmits an anomaly notification signal to the monitoring terminal 40 or the like (S8).

The control terminal 20 transmits, to the management apparatus 30, the operation information designated in the received detailed operation information request signal (S6).

The management apparatus 30 executes a second anomaly determination process on the basis of the detailed operation information received regarding the detailed operation information request signal (S7). The management apparatus 30 executes a notification process on the basis of a result of the second anomaly determination process, outputs a determination result from the output unit 35, and transmits an anomaly notification signal to the monitoring terminal 40, the maintenance terminal 50, or the like (S8).

In response to receipt of the anomaly notification signal, the monitoring terminal 40 or the maintenance terminal 50 appropriately outputs the content specified by the anomaly notification signal (S9). Accordingly, a monitor using the monitoring terminal 40, a maintenance worker using the maintenance terminal 50, or the like is able to grasp the presence or absence of an anomaly and the details of the anomaly.

While the device management system 1 is operating, the process is repeated in the above-described manner.

(5) Features

5-1

In the present embodiment, in the system including the control terminal 20 that collects information about the air conditioner 10 and the management apparatus 30 that manages the air conditioner 10, the anomaly determining unit 342 of the management apparatus 30 designates, in accordance with a received anomaly state, detailed operation information to be used to identify a cause of the anomaly state of the air conditioner 10. The transmission processing unit 232 of the control terminal 20 transmits the detailed operation information.

Accordingly, when an anomaly of the air conditioner 10 is estimated, the detailed operation information to be used to identify an anomaly cause in the management apparatus 30 is designated by the anomaly determining unit 342 in accordance with the received anomaly state. The designated detailed operation information is transmitted from the control terminal 20 to the management apparatus 30. As a result, even in a case where an anomaly cause of the air conditioner 10 is not identifiable only using the information held by the management apparatus 30, identification of the anomaly cause is promoted.

5-2

In the present embodiment, the terminal storage unit 21 of the control terminal 20 accumulates the detailed operation information. Accordingly, the detailed operation information is accumulated in the control terminal 20. As a result, when an anomaly of the air conditioner 10 is estimated, it is possible to transmit a plurality of pieces of detailed operation information from the control terminal 20 to the management apparatus 30, and identification of an anomaly cause is promoted.

5-3

In the present embodiment, the requesting unit 343 of the management apparatus 30 transmits, to the control terminal 20, a detailed operation information request signal of requesting transmission of the detailed operation information designated by the anomaly determining unit 342. The transmission processing unit 232 of the control terminal 20 transmits the detailed operation information in response to the detailed operation information request signal. Accordingly, the detailed operation information based on the request from the management apparatus 30 is transmitted from the control terminal 20 to the management apparatus 30.

5-4

In the present embodiment, the transmission processing unit 232 of the control terminal 20 transmits operation information specifying an operation state of the air conditioner 10 to the management apparatus 30 at a predetermined timing, and the storage unit 31 of the management apparatus 30 stores the operation information that has been acquired. The requesting unit 343 of the management apparatus 30 transmits the detailed operation information request signal in a case where an anomaly cause is not identifiable based on the operation information stored in the storage unit 31.

Accordingly, in a case where an anomaly cause is not identifiable based on the operation information held by the management apparatus 30, it is possible to transmit the detailed operation information from the control terminal 20 to the management apparatus 30. Accordingly, the management apparatus 30 is appropriately able to request detailed operation information when necessary, and the amount of communication is reduced. In relation to this, the capacity of the storage unit 31 of the management apparatus 30 is reduced. In addition, in the management apparatus 30 and the control terminal 20, the load of a process related to communication of operation information is reduced. In addition, the cost related to communication is reduced.

5-5

In the present embodiment, the requesting unit 343 requests, in the detailed operation information request signal, the detailed operation information which is the operation information collected at a shorter interval than the operation information stored in the storage unit 31 and/or information that is not held by the management apparatus 30 but is held by the control terminal 20. Accordingly, identification of an anomaly cause is particularly promoted.

5-6

In the present embodiment, the detailed operation information request signal includes information designating an ID and data item of the air conditioner 10 related to the detailed operation information that is requested. Accordingly, the load of a process related to communication of the detailed operation information in the control terminal 20 is reduced.

5-7

In the present embodiment, the acquisition processing unit 231 of the control terminal 20 collects operation information under a predetermined acquisition condition. Accordingly, in the control terminal 20, operation information is collected under the acquisition condition.

5-8

In the present embodiment, the device management system 1 is a system that manages the air conditioner 10, and identification of an anomaly cause is promoted when an anomaly of the air conditioner 10 is estimated.

(6) Modification Examples

The details according to the first embodiment can be modified as appropriate as illustrated in the following modification examples. Each modification example may be applied in combination with another modification example within the range in which no contradiction occurs.

(6-1) Modification Example 1A

The form of detailed operation information designated in a detailed operation information request by the management apparatus 30 can be appropriately changed in accordance with a situation. For example, the requesting unit 343 may request, in a detailed operation information request signal, detailed operation information which is operation information collected at a shorter interval than the operation information stored in the storage unit 31. For example, the detailed operation information is operation information collected at a shorter interval than the operation information stored in the storage unit 31 and used in a first anomaly determination process regarding the air conditioner 10 as the target of an anomaly determination process. For example, in a case where the operation information stored in the storage unit 31 is operation information collected at an interval of 10 minutes, the detailed operation information is operation information collected at an interval of 5 minutes. Accordingly, identification of an anomaly cause is particularly promoted.

(6-2) Modification Example 1B

The management apparatus 30 may be configured to request future operation information in a detailed operation information request. In other words, the management apparatus may perform a first anomaly determination process and then designate, as requested detailed operation information, operation information newer than the operation information used in the first anomaly determination process. For example, after the first anomaly determination process, the air conditioner 10 as a target of the first anomaly determination process may be caused to operate for a "predetermined time", and the control terminal 20 may be caused to collect and transmit operation information related to the operation as detailed operation information. The "predetermined time" is appropriately set in accordance with a situation. Accordingly, identification of an anomaly cause is particularly promoted.

In this case, the anomaly determining unit 342 of the management apparatus 30 may change the acquisition condition related to collection by the control terminal 20, when designating detailed operation information. For example, the anomaly determining unit 342 may designate an acquisition condition so that the designated detailed operation information is collected at an interval shorter than a current interval. For example, in a case where collection of operation information by the control terminal 20 is performed at an interval of 10 minutes, the anomaly determining unit 342 may change the acquisition condition so that the designated detailed operation information is collected at an interval of 5 minutes, shorter than the current interval. In this case, the anomaly determining unit 342 corresponds to a "changing unit" that changes the acquisition condition. In other words, the anomaly determining unit 342 may be configured to change the acquisition condition in a case where an anomaly of the air conditioner 10 is estimated and in a case where the details of the anomaly are not identifiable based on the operation information stored in the storage unit 31. Accordingly, the management apparatus 30 is capable of flexibly determining, in accordance with a situation, the manner of collecting detailed operation information in the control terminal 20. In this case, the requesting unit 343 may include, in a detailed operation information request signal, an instruction to change the acquisition condition to the acquisition condition designated by the anomaly determining unit 342 in the detailed operation information request process, or may independently transmit the instruction to the corresponding control terminal 20 separately from the detailed operation information request signal.

(6-3) Modification Example 1C

Either of the anomaly determining unit 342 and the anomaly notifying unit 344 in the processing unit 34 of the management apparatus 30 may be included in another apparatus as long as a processing result is appropriately transmitted to the management apparatus 30. For example, either of the anomaly determining unit 342 and the anomaly notifying unit 344 may be included in the control terminal 20 or the monitoring terminal 40 as long as detailed operation information is appropriately transmitted to the management apparatus 30.

(6-4) Modification Example 1D

The communication condition between the management apparatus 30 and each control terminal 20 can be individually changed as appropriate. For example, in the above-described embodiment, the control terminal 20 regularly transmits operation information to the management apparatus 30. However, the operation information need not necessarily be transmitted regularly. For example, a communication condition may be defined so that the control terminal 20 irregularly transmits operation information to the management apparatus 30. For example, a communication condition may be defined so that the control terminal 20 transmits operation information to the management apparatus 30 only in a case where an anomaly of the air conditioner 10 is estimated.

(6-5) Modification Example 1E

The individual acquisition conditions illustrated in FIG. 4 are merely examples. The acquisition conditions may be changed as appropriate in accordance with design specifications or a usage environment. For example, the acquisition conditions may be changed as appropriate regarding the contents of operation information acquired from the air conditioner 10 or an acquisition timing.

For example, an acquisition condition may be set so that operation information is collected from a device in a case where the state of the device or an environmental condition is in a specific state. For example, an acquisition condition may be set so that each piece of operation information is collected from the air conditioner 10 that is performing a cooling operation and so that any one or all of pieces of operation information are not collected from the other air conditioners 10. For example, an acquisition condition may be set so that each piece of operation information is collected from the air conditioner 10 that is installed in an environment in which an outdoor temperature is in a predetermined state (for example, 30° C. or more or 5° C. or less) and so that any one or all of pieces of operation information are not collected from the other air conditioners 10.

(6-6) Modification Example 1F

The operation information in the above-described embodiment is merely an example. The contents of operation information may be changed as appropriate in accordance with design specifications or a usage environment. For example, in the operation information, the first operation information D1 may be omitted as appropriate.

(6-7) Modification Example 1G

The flowchart of the process illustrated in FIG. 5 is merely an example. The flowchart of the process performed between the air conditioner 10, the control terminal 20, the management apparatus 30, and the monitoring terminal 40 may be changed as appropriate in accordance with design specifications or a usage environment.

(6-8) Modification Example 1H

In the above-described embodiment, the "device" as a target to be managed is the air conditioner 10. However, the device information may be about a device other than the air conditioner 10 (for example, a ventilation device, a humidity adjusting device, an air handling unit, a chiller unit, and/or another refrigeration device or the like).

(6-9) Modification Example 1I

The configuration of the device management system 1 illustrated in FIG. 1 can be changed as appropriate. For example, any one or all of the control terminals 20 may be built in the air conditioner 10. Specifically, any one or all of the control terminals 20 may be built in any one of the outdoor units 11. For example, any one or all of the control terminals 20 may be built in any one of the indoor units 12. A communication apparatus such as a router used by the control terminal 20 to access the communication network NW1 may be built in the air conditioner 10 together with the control terminal 20 or may be disposed independently. There may be both the air conditioner 10 that has the control terminal 20 built therein and the air conditioner 10 that does not have the control terminal 20.

Second Embodiment

Hereinafter, a device management system 1A according to a second embodiment of the present disclosure will be described. The following embodiment is a specific example, does not limit the technical scope, and can be appropriately changed without deviating from the gist. Differences from the device management system 1 according to the first embodiment will be mainly described. Hereinafter, the same parts as those of the device management system 1 will not be described in principle.

(1) Device Management System 1A

Figure 6:
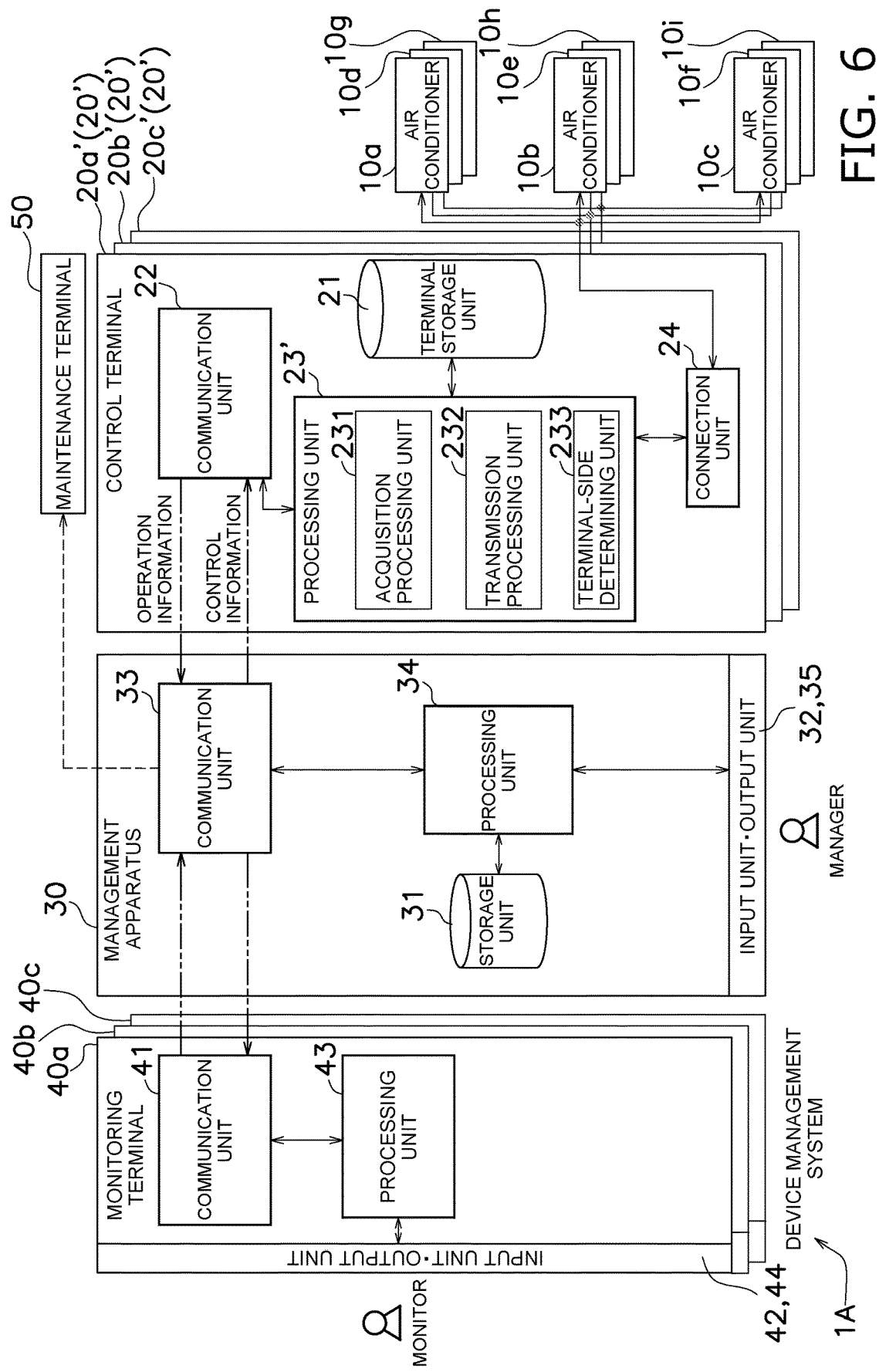
FIG. 6 is a schematic diagram illustrating functional blocks of individual apparatuses constituting a device management system according to a second embodiment.

FIG. 6 is a schematic diagram illustrating functional blocks of the individual apparatuses constituting the device management system 1A according to the present embodiment.

In the device management system 1A, the control terminals 20 are replaced with control terminals 20'. Each control terminal 20' includes a processing unit 23' instead of the processing unit 23.

The processing unit 23' of the control terminal 20' includes a terminal-side determining unit 233. The terminal-side determining unit 233 ("designating unit") performs a determination process corresponding to the first anomaly determination process in the first embodiment. Specifically, the terminal-side determining unit 233 performs a determination process on the basis of the operation information stored in the terminal storage unit 21. As a result of the determination process, in a case where an anomaly of the air conditioner 10 is assumed, the terminal-side determining unit 233 performs a process (detailed operation information determination process) of determining whether detailed operation information is necessary in identifying the details of the anomaly by the anomaly determining unit 342 of the management apparatus 30. In the detailed operation information determination process, in a case where it is determined that detailed operation information is necessary in identifying the details of the anomaly by the anomaly determining unit 342, the terminal-side determining unit 233 designates detailed operation information to be transmitted to the management apparatus 30. The form of the detailed operation information is similar to that described in the first embodiment.

In the present embodiment, the connection unit 24 that receives operation information from the air conditioner 10 corresponds to an "anomaly state input unit".

The transmission processing unit 232 performs a process (detailed operation information transmission process) of transmitting the detailed operation information designated by the terminal-side determining unit 233 to the management apparatus 30.

Figure 7:
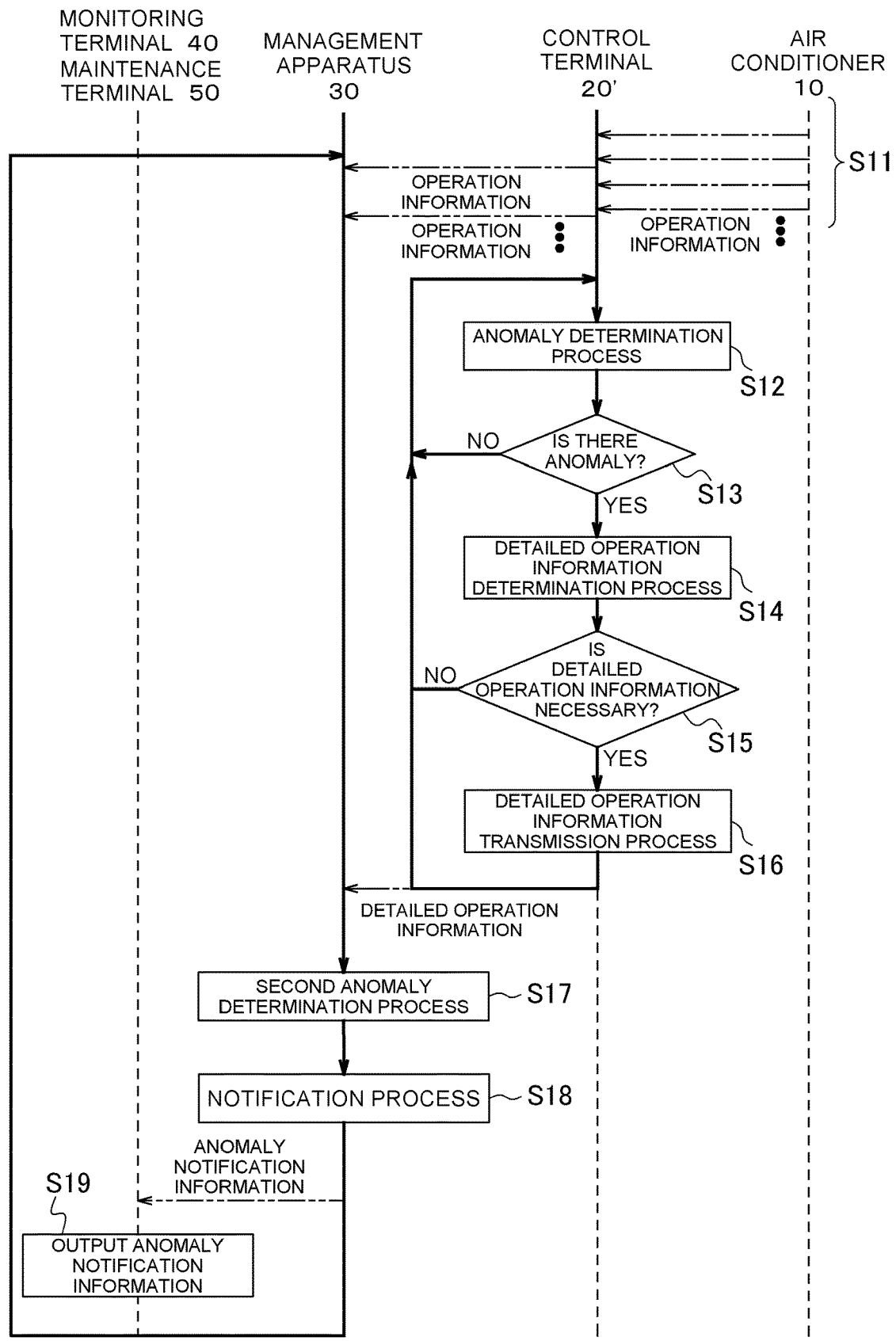
FIG. 7 is a schematic diagram for describing a flowchart of a process in the device management system according to the second embodiment.

FIG. 7 is a schematic diagram for describing a flowchart of a process in the device management system 1A according to the present embodiment. FIG. 7 illustrates a flowchart of a process in the relationship between a single air conditioner 10, a single management apparatus 30, a single control terminal 20', and a single monitoring terminal 40. However, the process illustrated in FIG. 7 is individually performed between the management apparatus 30, and each control terminal 20' and/or each monitoring terminal 40.

While the device management system 1 is operating, the control terminal 20' acquires operation information from the air conditioner 10 under an acquisition condition, and the control terminal 20' transmits the operation information to the management apparatus 30 under a communication condition (S11).

The control terminal 20' performs an anomaly determination process on the basis of the collected operation information (S12). As a result of the anomaly determination process, in a case where an anomaly is not assumed regarding the corresponding air conditioner 10 (S13—No), the control terminal 20' performs an anomaly determination process as necessary (S12). On the other hand, as a result of the anomaly determination process, in a case where an anomaly is assumed regarding the corresponding air conditioner 10 (S13—Yes), the control terminal 20' performs a detailed operation information determination process (S14).

As a result of the detailed operation information determination process, in a case where the control terminal 20' determines that it is not necessary to transmit detailed operation information to the management apparatus 30 (S15—No), the control terminal 20' performs an anomaly determination process as necessary (S12). On the other hand, as a result of the detailed operation information determination process, in a case where it is necessary to transmit detailed operation information to the management apparatus 30 (S15—Yes), the control terminal 20' transmits the detailed operation information designated by the terminal-side determining unit 233 to the management apparatus 30 (S16).

In response to receipt of the detailed operation information, the management apparatus 30 executes a second anomaly determination process (S17). The management apparatus 30 executes a notification process on the basis of a result of the second anomaly determination process, outputs a determination result from the output unit 35, and transmits an anomaly notification signal to the monitoring terminal 40, the maintenance terminal 50, or the like (S18).

In response to receipt of the anomaly notification signal, the monitoring terminal 40 or the maintenance terminal 50 appropriately outputs the content specified by the anomaly notification signal (S19). Accordingly, a monitor using the monitoring terminal 40, a maintenance worker using the maintenance terminal 50, or the like is able to grasp the presence or absence of an anomaly and the details of the anomaly.

While the device management system 1A is operating, the process is repeated in the above-described manner. Although not illustrated in FIG. 7, the management apparatus 30 may perform a first anomaly determination process (step S3 in FIG. 5) and/or a detailed operation information request process (step S5 in FIG. 5) before performing the second anomaly determination process (S17).

(2) Features

In the present embodiment, in the system including the control terminal 20' that collects information about the air conditioner 10 and the management apparatus 30 that manages the air conditioner 10, the terminal-side determining unit 233 of the control terminal 20' designates, in accordance with an estimated anomaly state, detailed operation information to be used to identify an anomaly cause when an anomaly of the air conditioner 10 is estimated. The transmission processing unit 232 of the control terminal 20' transmits detailed operation information on the basis of designation by the terminal-side determining unit 233.

Accordingly, when an anomaly of the air conditioner 10 is assumed, the detailed operation information to be used to identify an anomaly cause in the management apparatus 30 is designated by the terminal-side determining unit 233 in accordance with the estimated anomaly state. The designated detailed operation information is transmitted from the control terminal 20' to the management apparatus 30. As a result, even in a case where an anomaly cause of the air conditioner 10 is not identifiable only using the information held by the management apparatus 30, identification of the anomaly cause is promoted.

(3) Modification Examples

The details according to the second embodiment can be modified as appropriate as illustrated in the following modification examples. Each modification example may be applied in combination with another modification example within the range in which no contradiction occurs. The spirit implemented in the device management system 1 according to the first embodiment and the spirit according to the modification examples can also be applied to the device management system 1A according to the present embodiment within the range in which no contradiction occurs.

(3-1) Modification Example 2A

In the device management system 1A, the requesting unit 343 of the management apparatus 30 may be omitted as appropriate. The anomaly determining unit 342 need not necessarily perform a first anomaly determination process.

(3-2) Modification Example 2B

In the device management system 1A, the control terminal 20' need not necessarily perform regular transmission of operation information to the management apparatus 30.

(3-3) Modification Example 2C

The flowchart of the process illustrated in FIG. 7 is merely an example. The flowchart of the process executed by the management apparatus 30, the control terminal 20', and the monitoring terminal 40 may be changed as appropriate in accordance with design specifications or a usage environment.

(3-4) Modification Example 2D

In the device management system 1A, in a case where the anomaly determining unit 342 of the management apparatus 30 performs a first anomaly determination process, the control terminal 20' may be configured to perform a detailed operation information determination process and a detailed operation information transmission process in response to a request from the management apparatus 30. In other words, steps S12 and S13 in FIG. 7 may be performed by the anomaly determining unit 342 of the management apparatus 30. The control terminal 20' may be configured to perform a detailed operation information determination process and a detailed operation information transmission process in response to transmission of a request from the management apparatus 30 to the control terminal 20' between steps S13 and S14.

The embodiments have been described above. It is to be understood that the embodiments and the details can be variously changed without deviating from the gist and scope described in the claims.

What is claimed is:

1. A device management system comprising:
   a device information transmitting apparatus including a processor and a memory, the device information transmitting apparatus being configured to collect information about a device; and
   a management apparatus including a processor and a memory, the management apparatus being configured to communicate with the device information transmitting apparatus via a communication network,
   at least one of the management apparatus and the device information transmitting apparatus being configured to receive an anomaly state of the device, and
   designate, in accordance with the received anomaly state, first information to be used to identify a cause of the anomaly state of the device,
   the management apparatus being configured to transmit a first information request signal to the device information transmitting apparatus in order to request transmission of the first information,
   the device information transmitting apparatus being configured to transmit the first information to the management apparatus in response to the first information request signal,
   the device information transmitting apparatus being further configured to transmit operation information specifying an operation state of the device to the management apparatus at a predetermined timing, and
   the management apparatus being further configured to store the operation information that has been acquired, and transmit the first information request signal to the device information transmitting apparatus in a case in which an anomaly cause is not identifiable based on the operation information.

2. The device management system according to claim 1, wherein
the device information transmitting apparatus is configured to accumulate the first information.

3. The device management system according to claim 2, wherein
the device information transmitting apparatus is configured to
collect, under a predetermined first condition, operation information specifying an operation state of the device, and
transmit the collected operation information to the management apparatus.

4. The device management system according to claim 2, wherein
the device includes at least any one of
an air conditioning device,
a ventilation device,
a humidity adjusting device, and
a refrigeration device.

5. The device management system according to claim 1, wherein
the management apparatus is configured to request, in the first information request signal, the first information, and
the first information is at least one of
the operation information collected at a shorter interval than the operation information stored in the management apparatus and
information that is not held by the management apparatus but is held by the device information transmitting apparatus.

6. The device management system according to claim 1, wherein
the first information request signal includes information designating an ID and data item of the device related to the first information that is requested.

7. The device management system according to claim 1, wherein
the device information transmitting apparatus being configured to
collect, under a predetermined first condition, operation information specifying an operation state of the device, and
transmit the collected operation information to the management apparatus.

8. The device management system according to claim 7, wherein
the management apparatus is configured to change the first condition.

9. The device management system according to claim 7, wherein
the device includes at least any one of
an air conditioning device,
a ventilation device,
a humidity adjusting device, and
a refrigeration device.

10. The device management system according to claim 1, wherein
the device includes at least any one of
an air conditioning device,
a ventilation device,
a humidity adjusting device, and
a refrigeration device.

11. A device management system comprising:
a device information transmitting apparatus including a processor and a memory, the device information transmitting apparatus being configured to collect information about a device; and
a management apparatus including a processor and a memory, the management apparatus being configured to communicate with the device information transmitting apparatus via a communication network,
at least one of the management apparatus and the device information transmitting apparatus being configured to
receive an anomaly state of the device, and
designate, in accordance with the received anomaly state, first information to be used to identify a cause of the anomaly state of the device,
the device information transmitting apparatus being configured to
transmit the first information to the management apparatus,
collect, under a predetermined first condition, operation information specifying an operation state of the device, and
transmit the operation information that was collected to the management apparatus,
the management apparatus being configured to
store the operation information that has been acquired, and
change the first condition in a case in which an anomaly cause is not identifiable based on the operation information.

* * * * *